United States Patent
Uchikoba

[11] Patent Number: 6,127,296
[45] Date of Patent: Oct. 3, 2000

[54] CERAMIC-GLASS COMPOSITE MATERIAL AND METHOD FOR THE PREPARATION THEREOF

[75] Inventor: Fumio Uchikoba, Honjou, Japan

[73] Assignee: TDK Corporation, Tokyo, Japan

[21] Appl. No.: 09/292,746

[22] Filed: Apr. 16, 1999

[30] Foreign Application Priority Data

Apr. 24, 1998 [JP] Japan .................. 10-115319

[51] Int. Cl.⁷ .......................... C03C 14/00; C03C 3/087; C03C 3/091; C04B 35/26

[52] U.S. Cl. .................. 501/32; 501/66; 501/70; 501/72; 501/123; 501/125; 252/62.58; 252/62.59; 252/62.63; 252/62.64

[58] Field of Search .................. 501/32, 66, 70, 501/72, 123, 125, 126; 252/62.58, 62.59, 62.6, 62.63, 62.64

[56] References Cited

U.S. PATENT DOCUMENTS

| | | | |
|---|---|---|---|
| 4,540,500 | 9/1985 | Torii et al. | |
| 4,956,114 | 9/1990 | Watanabe et al. | 501/32 |
| 5,312,674 | 5/1994 | Haertling et al. | 501/32 |
| 5,476,728 | 12/1995 | Nakano et al. | 501/32 |
| 5,853,608 | 12/1998 | Kim | 501/32 |
| 5,855,810 | 1/1999 | Kim | 501/32 |

FOREIGN PATENT DOCUMENTS

| | | |
|---|---|---|
| 3-161910 | 7/1991 | Japan . |
| 9-167703 | 6/1997 | Japan . |

OTHER PUBLICATIONS

F. Uchikoba et al., *J. Cer. Soc. Japan*, 103(9), 969–973 (1995). (No Month).

*Primary Examiner*—Mark L. Bell
*Assistant Examiner*—David Sample
*Attorney, Agent, or Firm*—Wenderoth, Lind & Ponack, L.L.P.

[57] ABSTRACT

Disclosed is a novel ceramic-glass composite material useful as a material of electronic parts for attenuation of noise components in the GHz range. The composite material is a sintered body obtained by a heat treatment of a powder blend consisting of 35–55% by weight of a hexagonal ferrite of the formula $Ba_3M_2Fe_{24}O_{41}$ (M=Co, Ni and/or Zn) and the balance of a glass material consisting of $SiO_2$, $Al_2O_3$, SrO, CaO, MgO and $B_2O_3$, of which the content of SrO is 15–25% by moles, at a relatively low sintering temperature of 850–920 °C. for 10–30 minutes.

13 Claims, 2 Drawing Sheets

CERAMIC-GLASS COMPOSITE MATERIAL AND METHOD FOR THE PREPARATION THEREOF

BACKGROUND OF THE INVENTION

The present invention relates to a novel ceramic-glass composite material and a method for the preparation thereof. More particularly, the invention relates to a ceramic-glass composite material having usefulness as a material of electronic parts for attenuation of noise components in the GHz frequency range and a method for the preparation of such a material.

It is a trend in the technological field of electronic instruments in recent years that devices or parts are mounted on the instrument in an overcrowding density resulting in an explicit problem of interference between devices and radiation of noises.

Since noises are higher harmonics of the signals under use, noises can be effectively reduced by suppressing the higher harmonics. While it is known that beads by using certain magnetic ferrite material serve for this purpose by utilizing the high-frequency absorption of ferrites, such a material hardly exhibits attenuation in the signal range so that the effect of noise attenuation is accomplished by the absorption only in the ranges of the higher harmonics.

On the other hand, it is also known to prevent interference by shielding a region of the circuit with a metal plate. By this means, namely, noise components such as higher harmonics are shielded from the other blocks of the circuit so as to prevent adverse influences thereof.

Further, it is practiced to form a low-pass filter by means of an LC resonance circuit so as to prevent propagation of noises to the further stages. The noise component prevented from propagation by a resonance circuit, however, is not actually reduced but is merely reflected back to the former stages sometimes resulting in an undesirable phenomenon of oscillation and the like in the circuit.

While various methods are known as described above for suppression of noises, the most preferable is a method of absorption of unnecessary noise components, for example, by the use of ferrite beads.

FIG. 1 of the accompanying drawing is a perspective view illustrating a typical examples of conventional ferrite beads having a structure in which a block 1 of a hexagonally crystalline ferrite is provided with penetrating holes 2,2 and a silver conductor is bake-bonded to each penetrating hole 2. Outer electrodes 4,4 are further provided. In this device, the noise component is suppressed in the signals passing the device. See Japanese Patent Kokai 3-161910.

Alternatively, a device is known by using a spinel ferrite such as $NiCuZnFe_2O_4$. As is illustrated in FIG. 2 by a perspective view, a ferrite block 1 of a magnetic ceramic material capable of being sintered at about 900° C. is provided with a penetrating hole 2, which is integrally sintered in combination jointly with an internal conductor of silver to form a coil-formed conductor 3 within a sintered ceramic body having external electrodes 4,4. In this way, the line length pertaining to the loss can be increased and an increased impedance can be obtained so that the loss in the material can be efficiently utilized and, as a consequence, the device can be rendered compact.

In the spinel ferrites, however, the so-called Snake's critical line exists between the frequency and the complex magnetic permeability resulting in disappearance of the magnetism at a frequency of 2 GHz or higher not to fully exhibit the effect of noise suppression. Accordingly, suppression of noise at a higher frequency is usually undertaken by means of shielding with a metal plate or by using a low-pass filter.

While the hexagonal ferrite can be used within a high frequency range exceeding the frequency limit of the spinel ferrites, the sintering temperature thereof in a typical procedure is about 1250° C. to exceed the melting point of silver so that cofiring treatment thereof, which is required in the preparation of the ferrite beads having a structure shown in FIG. 2, can be undertaken only with a great difficulty. Further, the hexagonal ferrites have a low resistivity of about $10^5$ ohm·cm so that troubles of short-circuiting are frequently encountered in the metal plating treatment for the preparation of chip parts.

With an object to decrease the disadvantageously high sintering temperature of the conventional hexagonal ferrites, a proposal is made in Japanese Patent Kokai 9-167703 for a hexagonal ferrite containing one kind or more of alkaline earth metal elements, lead and/or copper, iron and oxygen. The performance of this ferrite material, however, cannot be estimated because the resistivity of the ferrite material is not reported there.

The inventors have directed their attention to and conducted investigations on a composite material, as a material for the above mentioned applications, consisting of a matrix phase of a glass material and a dispersed phase of a ferrite, which is a kind of ceramic-glass composite materials under development in recent years including, for example, an alumina-glass composite as a material of multilayer capacitors reported by Uchikoba, et al. in Journal of the Ceramic Society of Japan, volume 103, pages 969–973 (1995).

SUMMARY OF THE INVENTION

The present invention accordingly has an object, in view of the above described problems in the prior art, to provide a novel ceramic-glass composite material having a relatively low sintering temperature of about 900° C. and a sufficiently high volume resistivity to be suitable for ferrite beads containing a coil-formed conductor prepared by a cofiring treatment with a powder for a silver-based internal conductor.

Thus, the ceramic-glass composite material of the present invention is a sintered body of a powder blend consisting of:
(A) from 35 to 55% by weight of a hexagonal ferrite having a chemical composition expressed by the general formula

$$Ba_3M_2Fe_{24}O_{41}, \quad (I)$$

in which M is a divalent metallic element or a combination of divalent metallic elements selected from the group consisting of cobalt, nickel and zinc; and
(B) from 45 to 65% by weight of a glass material consisting of $SiO_2$, $Al_2O_3$, SrO, CaO, MgO and $B_2O_3$, of which the content of SrO is in the range from 15 to 25% by moles.

The above defined novel ferrite-glass composite material is prepared by the method of the present invention which comprises the steps of:
(a) blending (A) from 35 to 55% by weight of particles of a hexagonal ferrite having a chemical composition expressed by the general formula

$$Ba_3M_2Fe_{24}O_{41}, \quad (I)$$

in which M is a divalent metallic element or a combination of divalent metallic elements selected from the group consisting of cobalt, nickel and zinc, and (B) from 45 to 65% by weight of particles of a glass material consisting of $SiO_2$, $Al_2O_3$, SrO, CaO, MgO and $B_2O_3$, of which the content of SrO is in the range from 15 to 25% by moles, to give a powder blend; and (b) subjecting the powder blend to a sintering heat treatment at a temperature in the range from 850 to 920° C. for a length of time in the range from 10 to 30 minutes.

DETAILED DESCRIPTION OF THE PREFERRED EMBODIMENTS

Figure 1:
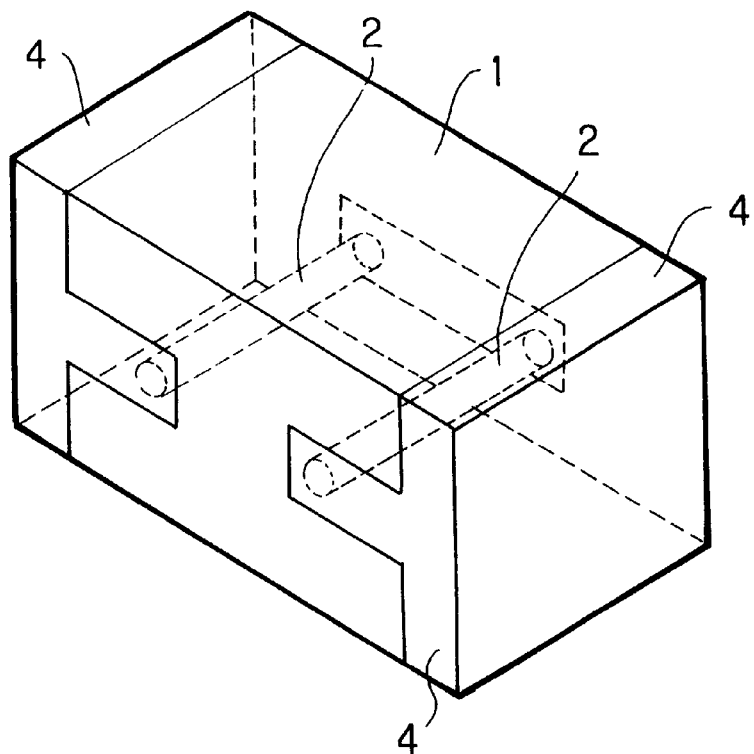
FIG. 1 is a perspective view of an example of conventional ferrite beads.
Figure 2:
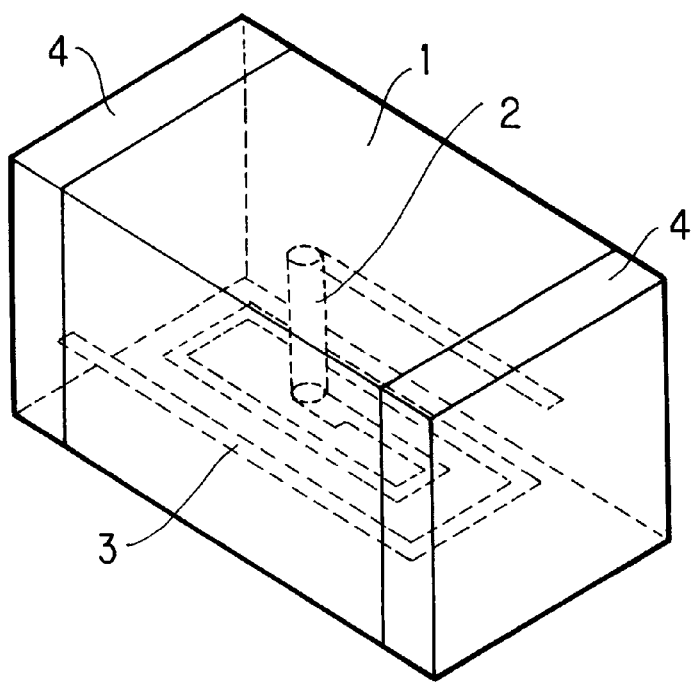
FIG. 2 is a perspective view of another example of conventional ferrite beads of the toroidal type.

The hexagonal ferrite which is one of the essential ingredients, i.e. component (A), of the inventive composite material has a chemical composition expressed by the general formula (I)

$$Ba_3M_2Fe_{24}O_{41},$$

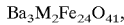

in which M has the same meaning as defined before. This ferrite material can be a cobalt-containing ferrite of the formula $Ba_3Co_2Fe_{24}O_{41}$ or can be obtained therefrom by replacing all or a part of cobalt with nickel, zinc or a combination thereof.

The hexagonal ferrite of such a chemical composition can be prepared by mixing BaO, MO and $Fe_2O_3$ in a specified molar proportion and pulverizing the same to give a powder blend which is subjected to a heat treatment at 1000 to 1300° C. to effect sintering followed by crushing and fine pulverization of the sintered mass, preferably, in a wet process into fine particles.

The glass material as the component (B), which is the other essential ingredient in the inventive composite material, has a chemical composition consisting of $SiO_2$, $Al_2O_3$, SrO, CaO, MgO and $B_2O_3$, of which the content of SrO is in the range from 15 to 25% by moles. The SrO as a constituent of the glass material has an effect of increasing the mechanical strength of the material and, while chip parts are usually required to have a mechanical strength of at least 1700 kg/cm$^2$ in the test of bending strength, this value of the bending strength can be obtained only when the content of SrO is at least 15% by moles. When the content of SrO is too high, for example, to exceed 25% by moles, however, crystallization of the glass material is promoted so that acicular or needle-shaped crystals are formed along with appearance of a great number of voids within the structure after the heat treatment.

The contents of the other oxide constituents than SrO in the glass material as the component (B) are not particularly limitative and can be selected from the ranges suitable for conventional glass materials. For example, the contents of $SiO_2$, $Al_2O_3$, CaO, MgO and $B_2O_3$ can be in the ranges of from 55 to 70% by moles, from 3 to 10% by moles, from 2 to 8% by moles, from 1 to 5% by moles and from 1 to 5% by moles, respectively.

The above mentioned glass material as the component (B) can be obtained by blending powders of $SiO_2$, $Al_2O_3$, SrO, $CaCO_3$, MgO and $B_2O_3$ in a specified molar proportion and subjecting the powder blend to a heat treatment at 1200 to 1500° C. to effect vitrification followed by crushing and fine pulverization of the vitrified material.

The ceramic-glass composite material of the present invention contains from 35 to 55% by weight or, preferably, from 40 to 50% by weight of the hexagonal ferrite as the component (A), the balance being the component (B).

Although the content of the glass material as the component (B) in the composite material should be as high as possible in order to increase the volume resistivity of the ceramic-glass composite body, the content of the hexagonal ferrite should be in the range from 35 to 55% by weight as mentioned above because, when the content of the ferrite as the component (A) is too low, a decrease is caused in the loss not to exhibit full noise absorption and the temperature of the heat treatment cannot be decreased as desired. The content of the hexagonal ferrite is preferably at least 40% by weight because the complex magnetic permeability of the composite material is increased thereby.

The ceramic-glass composite material of the present invention is prepared by blending the hexagonal ferrite as the component (A) and the glass material as the component (B) each in the form of fine particles in a specified weight proportion and subjecting the powder blend to a heat treatment at a temperature in the range from 850 to 920° C. to effect sintering. The length of time for the heat treatment can usually be in the range from 10 to 30 minutes but should be as short as possible. When the heat treatment time is too short, however, full densification cannot be accomplished of the composite material while, when the heat treatment time is too long, crystallization of the glass component proceeds leading to occurrence of a great number of voids within the sintered body.

The ceramic-glass composite material obtained in the above described manner usually has a structure consisting of the glass component forming the matrix phase and fine particles of the hexagonal ferrite uniformly dispersed in the matrix phase. It is sometimes the case that a solid solution is formed between the hexagonal ferrite and the glass material.

The ceramic-glass composite material prepared in the above described manner after the heat treatment at 850 to 920° C. usually has a relative density of 95 to 98% and the complex magnetic permeability thereof has an imaginary term $\mu"$ in the range from 1.3 to 2.3.

In the following, the ceramic-glass composite material and the method for the preparation thereof according to the present invention are described in more detail by way of examples. The ceramic-glass composite materials prepared in the following Examples were subjected to the evaluation tests for the testing items shown below by the respective testing procedures described there.

(1) Complex magnetic permeability

Measurements were made, within the frequency range not exceeding 1 GHz, by using a combination of an impedance analyzer (Model HP4291A, manufactured by Hewlett & Packard Co.) and a zig (Model HP16454A, manufactured by the same company, supra) for a toroidal sample and measurements were made, within the frequency range of 1 GHz or higher, by using a network analyzer (Model HP8720C, manufactured by the same company, supra) and a software (Model HP85071A, manufactured by the same company, supra) for a toroidal sample mounted on an air-line zig.

(2) Insulating resistance

A 5 mm by 5 mm square platelet sample of 0.5 mm thickness was provided on both major surfaces each with a silver electrode by the vapor-phase deposition method and measurements were made by using an ultrainsulating resistance tester (Model 4339A, manufactured by Hewlett & Packard Co.).

(3) Bending strength

Measurements were made by using a bending strength tester.

(4) Density as sintered

Measurements were made by the Archimedes' method and the density as determined was recorded in % relative to the theoretical density obtained by calculation.

REFERENCE EXAMPLE 1

Powders of barium oxide BaO, cobalt oxide CoO and iron oxide $Fe_2O_3$ were taken by weighing in a specified proportion for a target compositions and they were mixed together and pulverized in a wet process by using a ball mill followed by drying and mesh screening to give several different dried powder blends.

The powder blend was subjected to a heat treatment at 1200° C. for 2 hours to effect sintering and the sintered mass was again disintegrated and pulverized in a wet process for 16 hours followed by drying and mesh screening to give particles of a hexagonal ferrite. The ferrite powder was analyzed for the crystalline phases by the X-ray diffractometry to find that the principal phase was the Z-phase accompanied by the Y- and W-phases. The powder had a specific surface area of about 3 $m^2/g$.

REFERENCE EXAMPLE 2

Several powder blends were prepared from 57 to 67% by moles of $SiO_2$, 8% by moles of $Al_2O_3$, from 25 to 15% by moles of SrO, 4% by moles of $CaCO_3$, 3% by moles of MgO and 3% by moles of $B_2O_3$ to make up 100% by moles of the total and each of the powder blends was ground and finely pulverized with a mortar and pestle. The thus obtained powder blend was put into an alumina crucible and heated therein by increasing the temperature up to 1400° C. followed by casting and cooling of the vitrified melt to room temperature. The thus obtained glass material was crushed and finely pulverized in a wet process to give a fine glass powder having a specific surface area of about 2 $m^2/g$.

EXAMPLE 1

A powder blend of 35% by weight of the ferrite powder prepared in Reference Example 1 and 65% by weight of the glass powder prepared in Reference Example 2, of which the content of SrO was 20% by moles, was subjected to wet-process pulverization for 8 hours in a ball mill followed by drying and mesh screening to give a dried fine powder mixture. A 2% by weight of a polyvinyl alcohol in the form of an aqueous solution was added to the powder as a binder followed by further mesh screening and granulation into granules of about 80 μm diameter.

The granules were compression-molded in a metal mold under a compressive pressure of 1 ton/$cm^2$ into a molded body having dimensions of 5 mm by 5 mm square and 0.5 mm thickness.

The thus molded body was subjected to a sintering heat treatment in an electric furnace at 900° C. for 20 minutes to give a sintered ceramic-glass composite body which was subjected to the evaluation tests to give the results shown in Table 1 below.

EXAMPLES 2, 3 and 4

The experimental procedure in each of these Examples was substantially the same as in Example 1 except that the starting powder blend contained 45%, 40% and 50% by weight, respectively, of the ferrite powder, the balance being the same glass powder.

The results obtained by the evaluation tests of the sintered composite bodies are shown in Table 1.

Figure 3:
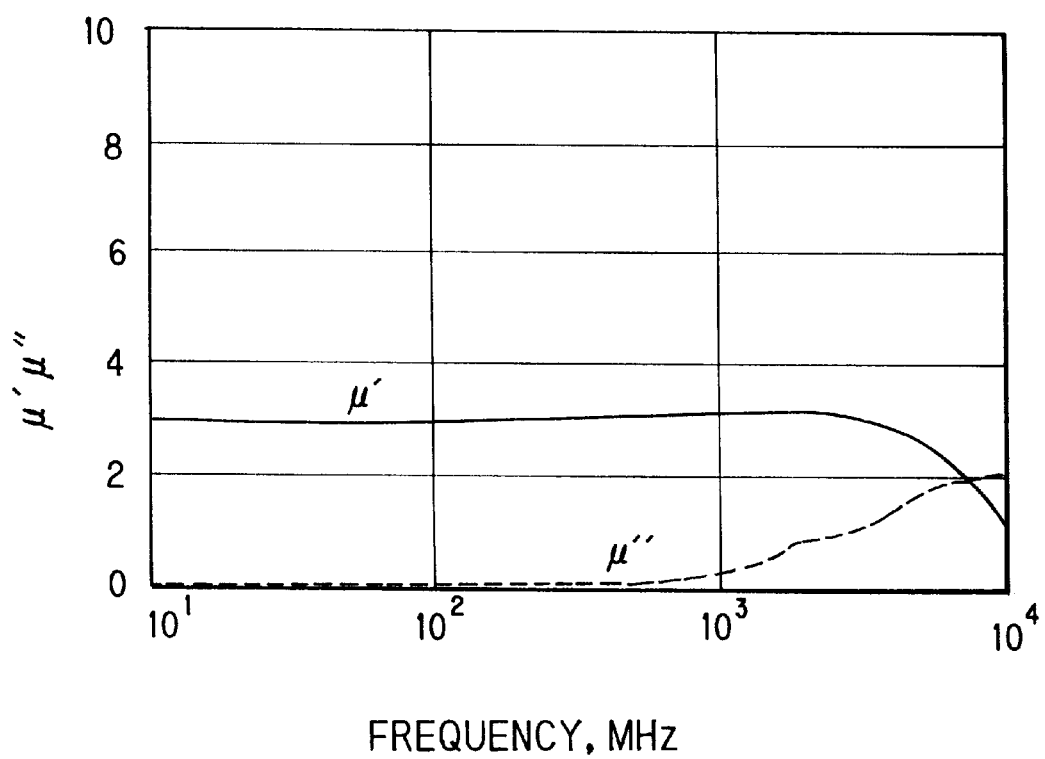
FIG. 3 is a graph showing the complex magnetic permeability of the composite material prepared in Example 2 as a function of frequency.

FIG. 3 of the accompanying drawing is a graph showing the complex magnetic permeability of the ceramic-glass composite body prepared in Example 2 as a function of the frequency in the range from $10^1$ to $10^4$ MHz by the solid line curve for the real term $\mu'$ and by the broken line curve for the imaginary term $\mu''$.

EXAMPLES 5 and 6

The experimental procedure in each of these Examples was substantially the same as in Example 1 except that the starting powder blend was prepared from 45% by weight of the same ferrite powder and 55% by weight of a different glass powder prepared in Reference Example 2 of which the content of SrO was 15% or 25% by moles, respectively.

The results obtained by the evaluation tests of the sintered composite bodies are shown in Table 1.

EXAMPLES 7 to 10

The experimental procedure in each of these Examples was substantially the same as in Example 1 except that the starting powder blend was prepared from 45% by weight of the same ferrite powder and 55% by weight of the same glass powder and the sintering heat treatment was conducted at 920° C. for 10 minutes, at 870° C. for 30 minutes, at 850° C. for 20 minutes or at 850° C. for 30 minutes, respectively.

The results obtained by the evaluation tests of the sintered composite bodies are shown in Table 1.

EXAMPLE 11

The experimental procedure in this Example was substantially the same as in Example 1 except that the starting powder blend contained 55% by weight of the same ferrite powder, the balance being the same glass powder.

The results obtained by the evaluation tests of the sintered composite body are shown in Table 1.

As is understood from the results of Examples 1 to 11 shown in Table 1, the resistivity, bending strength and relative density were high when the content of the ferrite powder was 35% by weight but the complex magnetic permeability could be high enough only by the increase of the ferrite content to 40% by weight or more.

COMPARATIVE EXAMPLE 1

The experimental procedure in this Comparative Example was substantially the same as in Example 1 except that the starting powder blend contained 57% by weight of the same ferrite powder, the balance being the same glass powder.

The results obtained by the evaluation tests of the sintered composite body are shown in Table 1.

COMPARATIVE EXAMPLES 2 and 3

The experimental procedure in each of these Comparative Examples was substantially the same as in Example 1 except that the starting powder blend was prepared from 45% by weight of the same ferrite powder and 55% by weight of a different glass powder prepared in Reference Example 2 of which the content of SrO was 10% or 30% by weight, respectively.

The results obtained by the evaluation tests of the sintered composite bodies are shown in Table 1.

COMPARATIVE EXAMPLES 4, 5 and 6

The experimental procedure in each of these Comparative Examples was substantially the same as in Example 1 except that the starting powder blend was prepared from 45% by weight of the same ferrite powder and 55% by weight of the same glass powder and the sintering heat treatment was conducted at 930° C. for 20 minutes, at 850° C. for 60 minutes or at 840° C. for 30 minutes, respectively.

The results obtained by the evaluation tests of the sintered composite bodies are shown in Table 1.

As is understood from the results in these Comparative Examples 1 to 6, an undue decrease was caused in the resistivity when the content of the ferrite powder exceeded 55% by weight and the bending strength was decreased when the content of SrO in the glass powder was less than 15% by moles. The bending strength was decreased when the content of the ferrite powder was too high or when the SrO content in the glass powder was too high. The relative density of the sintered body was also decreased when the content of SrO in the glass powder was too high. When the ceramic-glass composite body was prepared under improper conditions of the sintering heat treatment, the resistivity was decreased or the bending strength was decreased along with a decrease in the relative density consequently leading to inferior ambience resistance and instability of the physical properties.

TABLE 1

| | | Complex magnetic permeability at 5 GHz | | Resistivity, | Bending strength, | Relative density, |
|---|---|---|---|---|---|---|
| | | $\mu'$ | $\mu''$ | $\Omega$ cm | kg/cm² | % |
| Example | 1 | 1.3 | 1.1 | $2 \times 10^{12}$ | 1900 | 98 |
| | 2 | 2.2 | 1.6 | $1 \times 10^{12}$ | 1820 | 98 |
| | 3 | 1.9 | 1.4 | $2 \times 10^{12}$ | 1800 | 98 |
| | 4 | 2.5 | 2.3 | $8 \times 10^{11}$ | 1880 | 95 |
| | 5 | 2.3 | 1.6 | $1 \times 10^{12}$ | 1750 | 97 |
| | 6 | 2.0 | 1.3 | $5 \times 10^{11}$ | 1890 | 96 |
| | 7 | 2.1 | 1.5 | $1 \times 10^{12}$ | 1850 | 98 |
| | 8 | 2.0 | 1.5 | $8 \times 10^{11}$ | 1780 | 96 |
| | 9 | 1.9 | 1.4 | $7 \times 10^{11}$ | 1770 | 97 |
| | 10 | 1.8 | 1.3 | $6 \times 10^{11}$ | 1750 | 96 |
| | 11 | 2.7 | 1.7 | $1 \times 10^{11}$ | 1750 | 90 |
| Comparative Example | 1 | 2.6 | 1.8 | $2 \times 10^{9}$ | 1750 | 80 |
| | 2 | 2.2 | 1.5 | $6 \times 10^{11}$ | 1320 | 95 |
| | 3 | 2.2 | 1.5 | $8 \times 10^{11}$ | 1860 | 85 |
| | 4 | 2.2 | 1.4 | $1 \times 10^{10}$ | 1750 | 80 |
| | 5 | 1.9 | 1.6 | $8 \times 10^{9}$ | 1870 | 85 |
| | 6 | 1.8 | 1.3 | $1 \times 10^{10}$ | 1500 | 80 |

REFERENCE EXAMPLE 3

Several hexagonal ferrite powders were prepared in substantially the same manner as in Reference Example 1 excepting for different degrees of replacement of the cobalt oxide CoO with zinc oxide ZnO up to 100% to give a composition expressed by the general formula $$Ba_3(Co_{1-x}Zn_x)_2Fe_{24}O_{41},$$

in which x was a positive number not exceeding 1 giving the proportion of replacement of cobalt with zinc.

REFERENCE EXAMPLE 4

Another glass powder was prepared in substantially the same manner as in Reference Example 2 by using a powder blend consisting of 62% by moles of $SiO_2$, 8% by moles of $Al_2O_3$, 20% by moles of SrO, 4% by moles of CaO, 3% by moles of MgO and 3% by moles of $B_2O_3$.

EXAMPLE 12

A sintered body of a ceramic-glass composite material having dimensions of 5 mm by 5 mm square and 0.5 mm thickness was prepared in substantially the same manner as in Example 1 by using a powder blend consisting of 35% by weight of one of the ferrite powders prepared in Reference Example 3, of which the degree of replacement of cobalt oxide with zinc oxide, i.e. the value of x in the general formula, was 0.5, and 65% by weight of the glass powder prepared in Reference Example 4.

The results obtained by the evaluation tests of the sintered composite body are shown in Table 2.

EXAMPLES 13 to 17

The experimental procedure in each of these Examples was substantially the same as in Example 12 except that the starting powder blend was prepared from 45% by weight of one of the ferrite powders prepared in Reference Example 3, of which the degree of replacement of cobalt oxide with zinc oxide, i.e. the value of x in the general formula, was 0.1, 0.3, 0.5, 0.7 or 0.9, respectively, and 55% by weight of the same glass powder prepared in Reference Example 4.

The results obtained by the evaluation tests of the sintered composite bodies are shown in Table 2.

EXAMPLE 18

The experimental procedure in this Example was substantially the same as in Example 12 except that the starting powder blend was prepared from 45% by weight of one of the ferrite powders prepared in Reference Example 3, of which the degree of replacement of cobalt oxide with zinc oxide, i.e. the value of x in the general formula, was 1.0, and 55% by weight of the same glass powder prepared in Reference Example 4, and the sintering heat treatment was conducted at 900° C. for 10 minutes.

The results obtained by the evaluation tests of the sintered composite body are shown in Table 2.

EXAMPLES 19 to 22

The experimental procedure in each of these Examples was substantially the same as in Example 12 except that the starting powder blend was prepared from 50%, 40%, 55% or 45% by weight, respectively, of the same ferrite powder, the balance being the same glass powder prepared in Reference Example 4, and the sintering heat treatment was conducted at 900° C. for 30 minutes, at 880° C. for 20 minutes, at 900° C. for 20 minutes or at 920° C. for 30 minutes, respectively.

The results obtained by the evaluation tests of the sintered composite bodies are shown in Table 2.

As is understood from the results of Examples 12 to 22 shown in Table 2, the resistivity, bending strength and relative density were high when the content of the ferrite powder was 35% by weight but the complex magnetic permeability could be high enough only by the increase of the ferrite content to 40% by weight or more.

COMPARATIVE EXAMPLE 7

The experimental procedure in this Comparative Example was substantially the same as in Example 12 except that the starting powder blend consisted of 57% by weight of the same ferrite powder and 43% by weight of the same glass powder prepared in Reference Example 4.

The results obtained by the evaluation tests of the sintered composite body are shown in Table 2.

COMPARATIVE EXAMPLE 8

The experimental procedure in this Comparative Example was substantially the same as in Example 12 except that the starting powder blend consisted of 45% by weight of the same ferrite powder and 55% by weight of another glass powder prepared in about the same manner as in Reference Example 4 and consisting of 72% by moles of $SiO_2$, 8% by moles of $Al_2O_3$, 10% by moles of SrO, 4% by moles of CaO, 3% by moles of MgO and 3% by moles of $B_2O_3$.

The results obtained by the evaluation tests of the sintered composite body are shown in Table 2.

As is understood from the results in these Comparative Examples, the resistivity and relative density were decreased when the content of the ferrite powder exceeded 55% by weight and the bending strength was decreased when the content of SrO in the glass powder was lower than 15% by moles.

TABLE 2

|  |  | Complex magnetic permeability at 5 GHz | | Resistivity, | Bending strength, | Relative density, |
|---|---|---|---|---|---|---|
|  |  | $\mu'$ | $\mu''$ | $\Omega$ cm | kg/cm$^2$ | % |
| Example | 12 | 1.7 | 1.1 | $2 \times 10^{12}$ | 1800 | 98 |
|  | 13 | 3.1 | 1.6 | $1 \times 10^{12}$ | 1800 | 98 |
|  | 14 | 3.0 | 1.5 | $1 \times 10^{12}$ | 1800 | 98 |
|  | 15 | 3.1 | 1.3 | $1 \times 10^{12}$ | 1810 | 98 |
|  | 16 | 3.2 | 1.5 | $1 \times 10^{12}$ | 1790 | 96 |
|  | 17 | 3.0 | 1.6 | $8 \times 10^{11}$ | 1820 | 99 |
|  | 18 | 3.1 | 1.4 | $1 \times 10^{12}$ | 1850 | 98 |
|  | 19 | 3.4 | 1.5 | $3 \times 10^{11}$ | 1780 | 96 |
|  | 20 | 2.5 | 1.5 | $2 \times 10^{12}$ | 1770 | 99 |
|  | 21 | 3.6 | 2.1 | $2 \times 10^{11}$ | 1800 | 90 |
|  | 22 | 3.1 | 1.9 | $9 \times 10^{11}$ | 1850 | 94 |
| Comparative Example | 7 | 4.1 | 2.5 | $2 \times 10^{7}$ | 1700 | 89 |
|  | 8 | 4.0 | 2.1 | $3 \times 10^{11}$ | 1230 | 94 |

REFERENCE EXAMPLE 5

Further different hexagonal ferrite powders were prepared each in substantially the same manner as in Reference Example 1 excepting for the replacement of a part or all of the cobalt oxide CoO with nickel oxide NiO so that the ferrite had a composition expressed by the general formula $$Ba_3(Co_{1-y}Ni_y)_2Fe_{24}O_{41},$$

in which y is a positive number not exceeding 1 giving the molar degree of replacement of cobalt with nickel.

EXAMPLE 23

The experimental procedure in this Example was substantially the same as in Example 1 except that the starting powder blend was prepared from 35% by weight of one of the ferrite powders prepared in Reference Example 5, of which the molar degree of replacement of cobalt oxide with nickel oxide, i.e. the value of y in the general formula, was 0.5, and 65% by weight of the glass powder prepared in Reference Example 4.

The results of the evaluation tests of the ceramic-glass composite body are shown in Table 3.

EXAMPLES 24 to 28

The experimental procedure in each of these Examples was substantially the same as in Example 23 except that the starting powder blend was prepared from 45% by weight of one of the ferrite powders prepared in Reference Example 5, of which the molar degree of replacement of cobalt oxide with nickel oxide, i.e. the value of y in the general formula, was 0.1, 0.3, 0.5, 0.7 or 0.9, respectively, and 55% by weight of the same glass powders prepared in Reference Example 4.

The results obtained by the evaluation tests of the sintered composite bodies are shown in Table 3.

EXAMPLE 29

The experimental procedure in this Example was substantially the same as in Example 23 except that the starting powder blend was prepared from 45% by weight of one of the ferrite powders prepared in Reference Example 5, of which the molar degree of replacement of cobalt oxide with nickel oxide, i.e. the value of y in the general formula, was 1.0, and 55% by weight of the same glass powder prepared in Reference Example 4, and the sintering heat treatment was conducted at 900° C. for 10 minutes.

The results obtained by the evaluation tests of the sintered composite body are shown in Table 3.

EXAMPLES 30 to 33

The experimental procedure in each of these Examples was substantially the same as in Example 23 except that the starting powder blend was prepared from 50%, 40%, 55% or 45% by weight, respectively, of the same ferrite powder, the balance being the same glass powder prepared in Reference Example 4, and the sintering heat treatment was conducted at 900° C. for 30 minutes, at 880° C. for 20 minutes, at 900° C. for 20 minutes or at 920° C. for 30 minutes, respectively.

The results obtained by the evaluation tests of the sintered composite body are shown in Table 3.

As is understood from the results of Examples 23 to 33 shown in Table 3, the complex magnetic permeability could be particularly high when the ferrite content was 40% by weight or higher.

COMPARATIVE EXAMPLE 9

The experimental procedure in this Comparative Example was substantially the same as in Example 23 except that the starting powder blend consisted of 57% by weight of the same ferrite powder and 43% by weight of the same glass powder prepared in Reference Example 4.

The results obtained by the evaluation tests of the sintered composite body are shown in Table 3.

COMPARATIVE EXAMPLE 10

The experimental procedure in this Comparative Example was substantially the same as in Example 23 except that the starting powder blend consisted of 45% by weight of the same ferrite powder and 55% by weight of another glass powder prepared in about the same manner as in Reference Example 4 and consisting of 72% by moles of $SiO_2$, 8% by moles of $Al_2O_3$, 10% by moles of SrO, 4% by moles of CaO, 3% by moles of MgO and 3% by moles of $B_2O_3$.

The results obtained by the evaluation tests of the sintered composite body are shown in Table 3.

As is understood from the results in these Comparative Examples, the resistivity and relative density were decreased when the content of the ferrite powder exceeded 55% by weight and the bending strength was decreased when the content of SrO in the glass powder was lower than 15% by moles.

TABLE 3

| | | Complex magnetic permeability at 5 GHz | | Resistivity, | Bending strength, | Relative density, |
|---|---|---|---|---|---|---|
| | | $\mu'$ | $\mu''$ | $\Omega$ cm | kg/cm$^2$ | % |
| Example | 23 | 1.7 | 1.1 | $2 \times 10^{12}$ | 1800 | 98 |
| | 24 | 3.0 | 1.2 | $1 \times 10^{12}$ | 1780 | 99 |
| | 25 | 3.0 | 1.2 | $1 \times 10^{12}$ | 1800 | 98 |
| | 26 | 2.9 | 1.2 | $1 \times 10^{12}$ | 1800 | 98 |
| | 27 | 3.2 | 1.5 | $1 \times 10^{12}$ | 1810 | 98 |
| | 28 | 3.1 | 1.6 | $1 \times 10^{12}$ | 1820 | 98 |
| | 29 | 3.0 | 1.4 | $1 \times 10^{12}$ | 1790 | 98 |
| | 30 | 3.3 | 1.4 | $8 \times 10^{11}$ | 1780 | 96 |
| | 31 | 2.4 | 1.3 | $2 \times 10^{12}$ | 1790 | 98 |
| | 32 | 3.9 | 2.2 | $1 \times 10^{11}$ | 1800 | 92 |
| | 33 | 3.2 | 1.4 | $7 \times 10^{11}$ | 1750 | 96 |
| Comparative Example | 9 | 3.9 | 2.5 | $7 \times 10^{5}$ | 1730 | 85 |
| | 10 | 3.3 | 1.4 | $8 \times 10^{11}$ | 1120 | 95 |

What is claimed is:

1. A ceramic-glass composite material which is a sintered body of a powder blend consisting of:
   (A) from 35 to 55% by weight of a hexagonal ferrite having a chemical composition expressed by the general formula $$Ba_3M_2Fe_{24}O_{41},$$

in which M is a divalent metallic element or a combination of divalent metallic elements selected from the group consisting of cobalt, nickel and zinc; and
   (B) from 45 to 65% by weight of a glass material consisting of SiO$_2$, Al$_2$O$_3$, SrO, CaO, MgO and B$_2$O$_3$, of which the content of SrO is in the range from 15 to 25% by moles.

2. The ceramic-glass composite material as claimed in claim 1 in which the divalent metallic element denoted by M is cobalt.

3. The ceramic-glass composite material as claimed in claim 1 in which the divalent metallic element denoted by M is nickel.

4. The ceramic-glass composite material as claimed in claim 1 in which the divalent metallic element denoted by M is zinc.

5. The ceramic-glass composite material as claimed in claim 1 in which the combination of divalent metallic elements denoted by M is a combination of cobalt and nickel.

6. The ceramic-glass composite material as claimed in claim 1 in which the combination of divalent metallic elements denoted by M is a combination of cobalt and zinc.

7. The ceramic-glass composite material as claimed in claim 1 in which the powder blend consists of from 40 to 50% by weight of the component (A) and from 60 to 50% by weight of the component (B).

8. A method for the preparation of a ceramic-glass composite material which comprises the steps of:
   (a) blending (A) from 35 to 55% by weight of a powder of a hexagonal ferrite having a chemical composition expressed by the general formula $$Ba_3M_2Fe_{24}O_{41},$$

in which M is a divalent metallic element or a combination of divalent metallic elements selected from the group consisting of cobalt, nickel and zinc, and (B) from 45 to 65% by weight of a powder of a glass material consisting of SiO$_2$, Al$_2$O$_3$, SrO, CaO, MgO and B$_2$O$_3$, of which the content of SrO is in the range from 15 to 25% by moles, to give a powder blend; and (b) subjecting the powder blend to a heat treatment at a temperature in the range from 850 to 920° C. for a length of time in the range from 10 to 30 minutes.

9. The method for the preparation of a ceramic-glass composite material as claimed in claim 8 in which M is cobalt or a combination of cobalt and nickel or cobalt and zinc.

10. The method for the preparation of a ceramic-glass composite material as claimed in claim 8 in which the divalent metallic element denoted by M is nickel.

11. The method for the preparation of a ceramic-glass composite material as claimed in claim 8 in which the divalent metallic element denoted by M is zinc.

12. The method for the preparation of a ceramic-glass composite material as claimed in claim 8 in which the powder blend consists of from 40 to 50% by weight of the component (A) and from 60 to 50% by weight of the component (B).

13. The method for the preparation of a ceramic-glass composite material as claimed in claim 8 in which the powder blend subjected to a heat treatment in step (b) is in the form of a powder compact.

* * * * *